United States Patent [19]

Englert et al.

[11] Patent Number: 4,603,233

[45] Date of Patent: Jul. 29, 1986

[54] CONNECTION APPARATUS FOR THE MEASUREMENT, OBSERVATION AND MANIPULATION OF EVENTS IN A LARGE NUMBER OF TELEPHONE CIRCUITS

[75] Inventors: Vendel Englert, Budapest; József Gátmezei, Martonvásár; József Peszleg, Budapest; Éva Paczolai, Budapest; Tibor Tótok, Budapest; Peter Eisler, Budapest; György Hamvas, Miskolc, all of Hungary

[73] Assignee: BHG Hiradastechnikai Vallalat, Budapest, Hungary

[21] Appl. No.: 574,600

[22] Filed: Jan. 27, 1984

[30] Foreign Application Priority Data

Feb. 1, 1983 [HU] Hungary ............... 335/83

[51] Int. Cl.⁴ ............... H04M 15/00; H04Q 1/22
[52] U.S. Cl. ............... 179/8 A; 179/175.2 C
[58] Field of Search ............... 179/7.1 R, 8 A, 175.2 C

[56] References Cited

U.S. PATENT DOCUMENTS

| | | | |
|---|---|---|---|
| 3,916,123 | 10/1975 | Werner | 179/175.2 C |
| 4,022,978 | 5/1977 | Connell et al. | 179/8 A |
| 4,156,109 | 5/1979 | Kraushaar et al. | 179/8 A |
| 4,165,447 | 8/1979 | Bertoglio et al. | 179/7.1 R |
| 4,211,899 | 7/1980 | Ptacnik et al. | 179/175.2 C |
| 4,250,354 | 2/1981 | Karras | 179/8 A |
| 4,393,461 | 7/1983 | Holtey et al. | 364/900 |
| 4,399,332 | 8/1983 | Furlan et al. | 179/8 A |
| 4,412,101 | 10/1983 | Brown et al. | 179/7.1 R |

Primary Examiner—Stafford D. Schreyer
Attorney, Agent, or Firm—Karl F. Ross; Herbert Dubno

[57] ABSTRACT

Subject of the invention is a connection system for the measurement, observation and manipulation of events depending on, or independent from each other taking place in a large number of telephone circuits, furthermore for the preliminary supervision center. The connection system consists of traffic meter unit and efficiency meter connected to the examined circuits and common units of the telephone exchange, furthermore matching and control bus with the connected data processing and data separator unit, as well as data input and output unit connected to the data processing and data separator unit. The output data transfer wires of the traffic meter unit and efficiency meter are connected to the matching and control bus. One input of the traffic meter unit is interconnected with the output of the storage unit of the talking state of efficiency meter. Depending on the operation supervision functions the data transfer wires of the control supervision unit, output control unit, tariff control apparatus, service quality control unit and transfer unit are connected to the matching and control bus.

5 Claims, 1 Drawing Figure

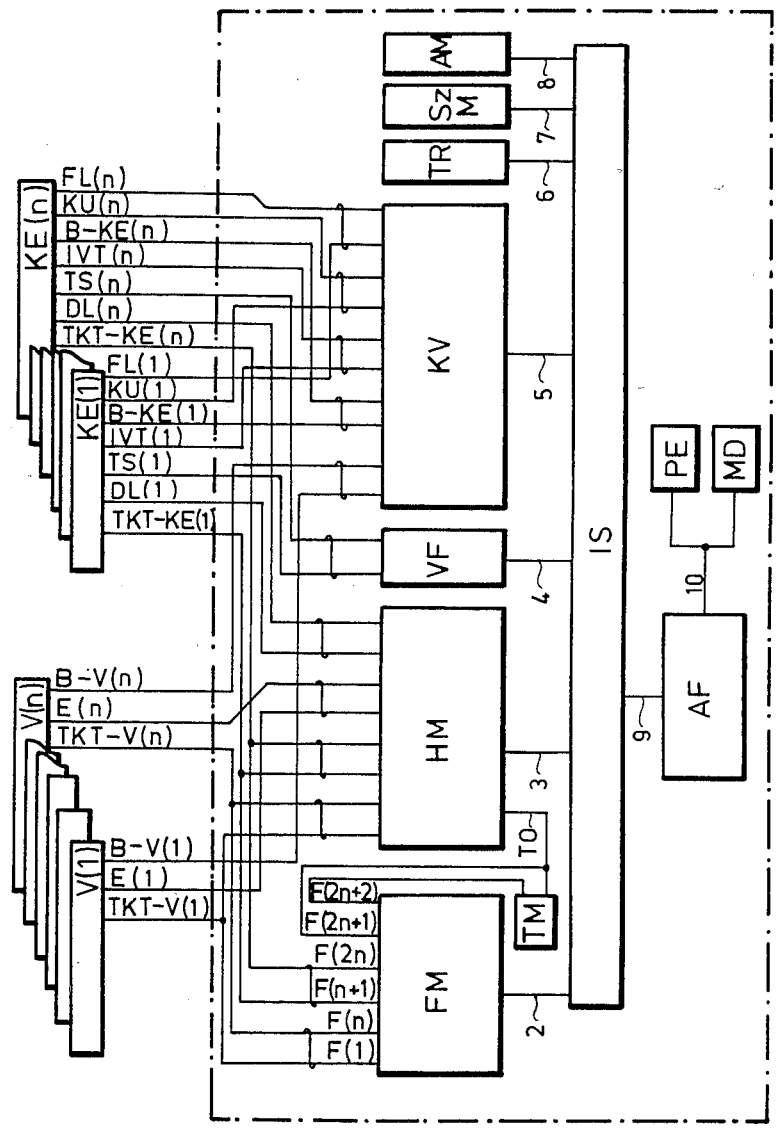

CONNECTION APPARATUS FOR THE MEASUREMENT, OBSERVATION AND MANIPULATION OF EVENTS IN A LARGE NUMBER OF TELEPHONE CIRCUITS

FIELD OF THE INVENTION

Our present invention relates to an apparatus for the measurement, observation and manipulation dependent on the supervision functions of events depending on one another or independent from each other taking place in a large number of telephone circuits, e.g. lines, and for the preliminary processing of the measured data and relaying it to the supervision center or monitoring station.

BACKGROUND OF THE INVENTION

Several arrangements related to the problems of such systems are known. For example in U.S. Pat. No. 3,916,123 the events taking place at a large number of independent input points are recorded. The drawback of this approach is that only independent events can be assessed and the system is not suitable for the supervision of input points, where the information is carried by the interrelation and, sequence of the events and not by the number and length of time of the events. A further disadvantage is that only those circuits or common units can be supervised, where the operative efficiency of the observed circuit or unit is characterized by a single input, since the simultaneous condition of two measuring points cannot be co-ordinated.

U.S. Pat. No. 4,117,278 provides an apparatus suitable for measuring the quality of the service, with the aid of which the quality of the service can be checked on different objects in a way significant to the subscribers. Here, however, the parameters characteristic to the quality of the service are not determined simultaneously with traffic and efficiency measurements, thus short of analyzing the causes of faults, intervention in the system is not possible.

Swiss Pat. No. 614170 provides in case of sub-exchanges for the collection of data related to the beginning and end of line seizures and/or tariff pulses in connection with each call. Since the apparatus is connected only to the lines of the telephone extensions, it does not give sufficient information on the operation of the total exchange for automatic intervention.

U.S. Pat. No. 3,796,837 provides traffic control of networks. A disadvantage of this system is that only the limitation of the calls among the control possibilities of the traffic is realized in case of overload, which is due to the fact that all of the traffic technical parameters of the telephone exchanges are not measured to the point that suitable methods of the traffic control could be selected.

Furthermore the AOM 101 type system of the Swedish Ericsson firm is also known, which supervises electronic telephone exchanges, but can be connected to electro-mechanical exchanges as well. However, with electro-mechanical exchanges the traffic of calls and efficiency of the telephone circuits can be measured only on those circuits which are provided with contacts for this purpose. There are line plug connectors in such installations which do not contain this additional information.

OBJECT OF THE INVENTION

The object of our invention is to eliminate the shortcomings of the earlier system and to provide an improved connection system which is suitable for the measurement, observation and manipulation in real time of events depending on, or independent from each other for a large number of telephone circuits such that centralization of the supervisory and maintenance functions is retained.

SUMMARY OF THE INVENTION

These objects are attained with a connection system which consists of a traffic metering unit and an efficiency meter connected to the common units of the examined circuits and telephone exchange, a matching and control bus, data processing and data separator unit, and data input and output units connected to the data processing and data separator unit.

The connection system according to the invention has data transfer wires of the traffic meter and efficiency meter units connected to the matching and control bus and joined to the input of the data processing and data separator unit, while one input of the traffic meter unit is interconnected with the output of the storage unit registering the speech state of the efficiency meter, and the other input of the traffic meter unit is interconnected with the output of the time meter joined to the output of the storage unit registering the speech state of the efficiency meter. Furthermore the matching and control bus is provided with connection points for the data transfer wires of the output control unit and/or traffic control apparatus, and/or to the service quality control unit, and/or transfer meter unit connected to the supervision unit controlled according to the supervision functions and/or to the examined circuits (trunks), or line plug connectors, and to the common units of the telephone exchange.

Furthermore characteristic of the connection the first output of the output control unit can be connected to the inhibiting input of the line plug connectors, the second output to the inhibiting input of the common units, the third output to the input of the common unit permitting examination of the recurred holding, the fourth output to the timing control input of the common unit, the fifth output to the by-pass address input of the common unit.

A modem can be connected to the data processing and data separator unit.

The advantage of the invention is that while the known systems realize the measuring and supervisory functions mostly separately, the connection system according to the invention enables the simultaneous measurement of the parameters characteristic of traffic to the quality of the service and to the signals related to supervision. This way an in-depth analysis of the relationships and thereby the significant improvement of the accuracy of fault detection and increased efficiency of the maintenance can be realized.

The solution according to the invention offers the opportunity for introducing efficient traffic control procedures through the simultaneous real-time measurements of the different parameters characteristic to the operation of the telephone exchange and with the application of the output control unit, whereby the optimal traffic transaction capacity of the telephone exchange is ensured under any load conditions.

A further advantage of the invention is that it offers the opportunity for the detailed analysis of the faults occuring in the circuits or in the common units of the telephone exchange. With the aid of the connection system it can be established in what way the faults may influence the traffic transaction capacity of the exchange. Through evaluation of the results the possibility is open for the formation of the optimal configuration.

BRIEF DESCRIPTION OF THE DRAWING

The sole FIGURE of the drawing is a block diagram illustrating the circuitry of the invention.

SPECIFIC DESCRIPTION

The diagram shows a circuit suitable for the measurement, observation and manipulation, dependent on the supervision functions, of n-circuits of common units of a telephone exchange, and for the preliminary processing and relaying of the measured data.

The connection system according to the invention consists of a traffic meter unit FM, the inputs F(1) . . . F(n) of which are connected to wires TKT−V(1) . . . TKT−V(n) signalling the holding state or line seizure of the examined circuits V(1) . . . V(n), e.g. trunk lines, and its further inputs F(n+1) . . . F(2n) are connected to wires TKT−KE(1) . . . TKT−KE(n) of common units KE(1) . . . KE(2n) of the exchange. Input F(2n+1) of traffic meter unit FM is interconnected with output TO of an efficiency meter HM with speech state storage and further input F(2n+2) is interconnected with the output of a time meter TM joined to output TO. Data transfer wire (2) of the output of traffic meter FM is connected to the matching and control bus IS.

Wires TKT−V(1) . . . TKT−V(n) and TKT−KE(1) . . . TKT−KE(n) of the examined circuits V(1) . . . V(n) and common units KE(1) . . . KE/n/, as well as signal wires E(1) . . . E(n) carrying signals representing the efficiency of the examined circuits V(1) . . . V(n) are connected to the inputs of the efficiency meter HM. The efficiency meter HM is interconnected also with the fault signal wires DL(1) . . . DL(n) of common units KE(1) . . . KE(n). The output data transfer wire 3 of the efficiency meter HM is connected to matching and control bus IS. Depending on the supervision functions, the data transfer wire 4 of the control supervision unit VF, the data transfer wire 5 of the output control unit KV, data transfer wire 6 of the tariff control apparatus TR, data transfer wire 7 of the service quality control unit SzM and the data transfer wire 8 of transfer meter or transmission parameter measuring unit AM are connected to the matching and control bus IS. The matching and control bus IS is interconnected through the data transfer wire 9 with the data processing and data separator unit AF, the data transfer wire 10 of which is connected to data input and output unit PE and to modem MD.

The control supervision unit VF is interconnected also with the congestion indicating wire TS(1) . . . TS(n) of the common units KE(1) . . . KE(n).

Outputs of the output control unit KV are connected partly to wires B−V(1) . . . B−V(n) and B−KE(1) . . . B−KE(n) blocking the examined circuit V(1) . . . V(n) and common units KE(1) . . . KE(n), and partly to the timing control wires IVT(1) . . . IVT(n) as well as to the by-pass address wires KU(1) . . . KU(n) and to the wires FL(1) . . . FL(n) permitting the examination of recurring line seizure.

The connection system according to the invention operates as follows:

Signals appear on wires TKT−V(1) . . . TKT(n) characteristic of line seizure of the examined circuit V(1) . . . V(n) during the on time of the circuit, which signal is relayed to the inputs of traffic meter unit FM and efficiency meter HM. In this case the traffic intensity of the examined circuits appears in coded form on the output of traffic meter unit FM.

The exclusive speech time is measured with the information characteristic of the speech state relayed from the output TO of the efficiency meter HM to the input F(2n+1) of traffic meter FM. Thus the traffic meter FM measures separately the traffic intensity of line seizure and traffic intensity of the speech state. On the basis of the information relayed from the time meter TM connected to the output TO of the efficiency meter HM, the effective talking traffic is obtained at the output of traffic meter FM. The difference between the speech state traffic and effective speech traffic contains the calls, which consist of faulty connections or very short connections. The data, e.g. line seizure traffic, number of seizures, number of speech states, traffic of speech state, traffic of effective speech are relayed from the traffic meter FM through the matching and control bus IS to the data processing and data separator unit AF. In case of examination of the trunks the ratio of the number of line seizures and number of speech state calls and in case of examination of the common units KE the ratio of the total number of seizures and the number of connections ending in irregular operation appear on the output data transfer wire 3 of the efficiency meter HM. The measured data are relayed through the matching and control bus IS into the data processing and data separator unit AF.

The data processing and data separator unit AF detects the faulty circuit on the basis of the measured data, and relays an inhibiting signal through the matching and control bus IS and through the output control unit KV to the blocking input of the examined and faulty circuit.

The signals characteristic to the number of congestions of common units KE(1) . . . KE(n) are relayed to the inputs to the control supervision unit VF. The control unit VF counts off the number of signals, measures and adds up the time of the signals. When the set time limit is exceeded, the identifier signal of the examined unit is relayed through the matching and control bus IS into the data processing and data separator unit AF. In case of busy traffic and intensive congestion the data processing and data separator unit AF on the basis of the traffic data of the traffic meter unit FM and signal for the control supervision unit VF emits a signal restricting the incoming traffic to the blocking wire of the examined circuits or units. If only the value of the congestion is high then instead of restricting the incoming traffic, the identifying signal of the congested unit is relayed to the service list. The data processing and data separator unit AF—depending on the data arriving from the traffic meter unit FM—changes the strategy of by-pass selection of the exchange with the aid of the signal relayed through the output control unit KV to the by-pass address wires KU(1) . . . KU(n). The traffic meter unit FM measures the traffic of the common units KE(1) . . . KE(n). Depending on the intensity of the traffic, the examination of the recurring holding of the examined circuit is inhibited with the signal relayed through the output control unit KV to the wire FL(1) . . . FL(n) permitting the examination of the recurring seizure based on the specific algorithm arranged in the data processing an data separator unit AF. This way in case of intensive traffic the call transaction capacity of the telephone exchange is increased.

If the efficiency meter HM detects a faulty circuit among the examined ones, the identifier of the circuit in question is transferred to the data processing and data separator unit AF, which initiates measurement towards the transfer meter unit AM. The measuring program of the transfer meter unit AM is contained in the data processing and data separator unit AF. The data processing and data separator unit AF lists the low efficient circuit automatically among the measuring tasks of the transfer meter unit AM. The service quality control unit SzM records the real services of the telephone exchange cognizable by the subscribers and relays the services through the matching and control bus IS to the data processing and data separator unit AF. The service data from the data processing and data separator unit AF together with the data of the efficiency meter HM and control supervision unit VF are relayed to the data input and output unit PE, or depending on the operator's instruction into the modem MD for the purpose of transfer into the centralized operation supervision and maintenance center.

The inputs of the tariff control apparatus TR are connected to the counting wires of the telephone exchange. The tariff control apparatus TR counts the tariff pulses corresponding to the given call. The measured pulse number, the identifier of the examined circuit is relayed through the matching and control bus IS into the data processing and data separator unit. AF.

The traffic and efficiency data of the examined and identified circuit are relayed by the data processing and data separator unit AF into the data input and output unit PE, or depending on the operator's instruction to the service list.

The solution according to the invention is eminently suitable for the formation of an optimal centralized operation supervision and maintenance system, since according to the divided intelligence principle it is capable to realize independently the tasks in addition to the measurements, initiation of the invention and evaluation assuming the knowledge of the total network.

What we claim is:

1. A circuit for monitoring a telephone system comprising an exchange having a multiplicity of telephone lines KE(1) . . . KE(n) and a multiplicity of subscriber circuits V(1) . . . V(n) and in which each of said subscriber circuits V(1) . . . V(n) has a seizure line TKT−V(1). . . TKT−V(n), and each of said telephone lines KE(1) . . . KE(n) has a respective seizure line TKT−KE(1). . . TKT−KE(n), said monitoring circuit comprising:

a traffic meter FM connected to said seizure lines TKT−V(1) . . . TKT−V(n) and TKT−KE(1) . . . TKT−KE(n) for generating an output representing traffic at said subscriber circuits and at said telephone lines;

a matching and control bus IS connected to said output (2) of said traffic meter FM;

an efficiency meter HM receiving efficiency signals from said subscriber circuits and said telephone lines and having a speech state storage unit having an output TO and a data transfer output (3), said data transfer output (3) of said efficiency meter HM being connected to said matching and control bus IS;

a time meter TM connected to said output TO of the speech state storage unit of said efficiency meter HM and to an input of said traffic meter FM;

an output control unit connected to said matching and control bus IS and having outputs connected to said subscriber circuits and said telephone lines for selectively blocking same;

a supervisor control unit VF connected to said matching and control bus IS and to supervising lines TS(1) . . . TS(n) of said telephone lines;

a tariff control unit TR, a service quality control unit SZM and a transmission parameter measuring unit AM, each being connected to said matching and control bus IS;

a data processing unit AF connected to said matching and control bus IS for evaluating data received from said units and said traffic and efficiency meters for fault detection and service monitoring; and a data input and output terminal PE connected to said data processing unit AF.

2. The circuit defined in claim 1 wherein each of said subscriber circuits has an efficiency output E(1) . . . E(n) connected to said efficiency meter.

3. The circuit defined in claim 2 wherein each of said subscriber circuits has a blocking input B−V(1) . . . B−V(n) and each of said telephone lines has a blocking input B−KE(1) . . . B−KE(n) connected to said output control unit for selectively blocking of said subscriber circuits and said telephone lines.

4. The circuit defined in claim 3 wherein each of said telephone lines has a bypass address wire KU(1) . . . KU(n) connected to said output control unit KV for bypass selection of said telephone lines of said exchange for evaluating data received from said units and said traffic and efficiency meters for fault detection and service monitoring.

5. The circuit defined in claim 4 wherein each of said telephone lines has an inhibiting wire FL(1) . . . FL(n) receiving an output from said output control unit KV in response to said data processing unit AF upon recurrent seizure to increase call transaction capacity of said exchange.

* * * * *